(12) United States Patent
Foster et al.

(10) Patent No.: US 9,849,828 B2
(45) Date of Patent: Dec. 26, 2017

(54) STATUS INDICATOR FOR AN AUTONOMOUS AGRICULTURAL VEHICLE

(71) Applicants: CNH Industrial America LLC, New Holland, PA (US); Autonomous Solutions, Inc., Mendon, UT (US)

(72) Inventors: Christopher A. Foster, Mohnton, PA (US); Bret Todd Turpin, Wellsville, UT (US); Mitchel R. Torrie, Hyrum, UT (US); John H. Posselius, Ephrata, PA (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 0 days.

(21) Appl. No.: 15/090,163

(22) Filed: Apr. 4, 2016

(65) Prior Publication Data

US 2017/0282784 A1    Oct. 5, 2017

(51) Int. Cl.

| G07C 5/08 | (2006.01) |
|---|---|
| B60Q 1/26 | (2006.01) |
| A01B 76/00 | (2006.01) |
| B60Q 1/50 | (2006.01) |
| B60Q 5/00 | (2006.01) |

(52) U.S. Cl.
CPC ............ *B60Q 1/2607* (2013.01); *A01B 76/00* (2013.01); *B60Q 1/2611* (2013.01); *B60Q 1/50* (2013.01); *B60Q 5/005* (2013.01); *G07C 5/0825* (2013.01); *G07C 5/0833* (2013.01); *B60Q 2400/20* (2013.01)

(58) Field of Classification Search
None
See application file for complete search history.

(56) References Cited

U.S. PATENT DOCUMENTS

| 5,204,814 A | 4/1993 | Noonan et al. |
| 5,469,356 A | 11/1995 | Hawkins et al. |
| 5,929,788 A * | 7/1999 | Vukosic ............... B60Q 1/2611 340/471 |

(Continued)

FOREIGN PATENT DOCUMENTS

WO    2015151055 A1    10/2015

OTHER PUBLICATIONS

Torchinsky, J; Autonomous Cars Need a Special Indicator Lamp; http://jalopnik.com/autonomous-cars-need-a-special-indicator-lamp-1755210594; Jan. 26, 2016.

(Continued)

*Primary Examiner* — Calvin Cheung
*Assistant Examiner* — Kevin P Mahne
(74) *Attorney, Agent, or Firm* — Rebecca L. Henkel; Rickard K. DeMille (57) ABSTRACT

An indicator system for an autonomous agricultural vehicle includes a multicolor lighting assembly. The indicator system includes a controller comprising a memory operatively coupled to a processor. The processor is configured to select a status indication from a plurality of status indications that corresponds to a current operating state of a plurality of operating states. The processor is configured to output a second signal indicative of instructions to control the multicolor lighting assembly based on the status indication. The multicolor lighting assembly emits a light in response to the second signal.

20 Claims, 3 Drawing Sheets

(56) References Cited

U.S. PATENT DOCUMENTS

| | | |
|---|---|---|
| 8,618,922 B2 | 12/2013 | Debouk et al. |
| 8,954,252 B1 | 2/2015 | Urmson et al. |
| 8,996,224 B1 | 3/2015 | Herbach et al. |
| 9,150,200 B2 | 10/2015 | Urhahne |
| 2013/0325202 A1 | 12/2013 | Howard et al. |
| 2014/0265239 A1 | 9/2014 | Foster et al. |
| 2015/0006005 A1 | 1/2015 | Yu et al. |
| 2015/0066290 A1* | 3/2015 | Ruffner .................... B60Q 1/50 701/33.9 |
| 2015/0134180 A1 | 5/2015 | An et al. |
| 2015/0268665 A1 | 9/2015 | Ludwick et al. |
| 2015/0336502 A1* | 11/2015 | Hillis ....................... B60Q 1/26 701/23 |
| 2016/0202102 A1* | 7/2016 | Mishima .................. B60Q 9/00 340/450 |

OTHER PUBLICATIONS

International Search Report and Written Opinion for PCT/US2017/025778 dated Jun. 20, 2017, 11 pages.

\* cited by examiner

STATUS INDICATOR FOR AN AUTONOMOUS AGRICULTURAL VEHICLE

BACKGROUND

The invention relates generally to agricultural vehicles, and, more specifically, to a status indicator for an autonomous agricultural vehicle.

Vehicles, such as agricultural tractors, may be driven through a field of crops to perform various agricultural operations. In recent years, agricultural vehicles have been designed to operate at least partially without input from an onboard operator. For example, the vehicle may perform one or more operations by receiving one or more instructions remotely, thereby enabling the vehicle to operate at least partially in an autonomous manner (e.g., without input from an operator within the vehicle). For example, a remote operator or instructions from a remote control system may activate the vehicle and initiate operations.

BRIEF DESCRIPTION

A summary of certain embodiments disclosed herein is set forth below. It should be understood that these aspects are presented merely to provide the reader with a brief summary of these embodiments and that these aspects are not intended to limit the scope of this disclosure. Indeed, this disclosure may encompass a variety of aspects that may not be set forth below.

In a first embodiment, an indicator system for an autonomous agricultural vehicle includes a multicolor lighting assembly, and a controller comprising a memory operatively coupled to a processor, wherein the processor is configured to select a status indication from a plurality of status indications that corresponds to a current operating state of a plurality of operating states, and to output a second signal indicative of instructions to control the multicolor lighting assembly based on the status indication, wherein the multicolor lighting assembly emits a light in response to the second signal.

In a second embodiment, an indicator system for an autonomous agricultural vehicle includes a lighting assembly having at least one light indicator, wherein the at least one light indicator is configured to emit a flashing light to indicate a first operational state of the autonomous agricultural vehicle and to emit a continuous light to indicate a second operational state of the autonomous agricultural vehicle, different from the first operational state, and a controller comprising a processor operatively coupled to a memory, wherein the processor is configured to instruct the at least one light indicator to emit the flashing light or the continuous light based on the first operational state or the second operational state.

In a third embodiment, an indicator system for an autonomous agricultural vehicle includes a multicolor lighting system comprising at least one light indicator, and a controller configured to instruct the at least one light indicator to emit light of a first color to indicate a first operational state of a plurality of operational states of the autonomous agricultural vehicle and to emit light of a second color, different from the first color, to indicate a second operational state of the plurality of operational states of the autonomous agricultural vehicle, wherein the first operational state comprises at least one of operation of an engine while the autonomous agricultural vehicle is substantially stationary and a connection established between the autonomous vehicle and a base station.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
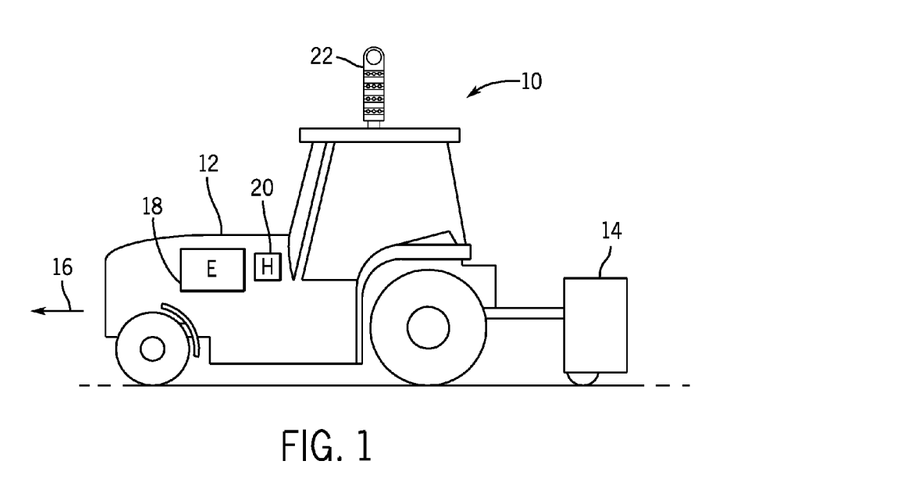
FIG. 1 is a side view of an embodiment of an agricultural system, including a lighting assembly configured to indicate a status of the agricultural system.

Turning to the figures, FIG. 1 is a side view of an agricultural system 10 that includes an agricultural vehicle 12, such as a tractor or another prime mover. The agricultural vehicle 12 is configured to tow an agricultural implement 14 along a direction of travel 16 through an agricultural field to perform various agricultural operations. For example, the agricultural implement 14 may be a tillage tool, a fertilizer application tool, a seeding or planting tool, or a harvesting tool, among others. While the agricultural implement 14 is towed by (e.g., in front of or behind) the agricultural vehicle 12, it should be appreciated that in alternative embodiments, the agricultural implement may be incorporated into the agricultural vehicle.

In the illustrated embodiment, the agricultural vehicle 12 is configured to operate autonomously (e.g., without input from an operator, without an operator present in the cab of the agricultural vehicle, etc.). Accordingly, an automatic system may direct the agricultural vehicle 12 and the agricultural implement 14 without direct control from an operator within the cab. For example, an operator may input instructions at a control system and/or automatic instructions may be generated at a remote base station and sent to the agricultural system 10 may, thereby directing the agricultural system to perform various agricultural operations.

The agricultural vehicle 12 includes an engine 18 that enables the agricultural vehicle 12 to move throughout the field and to provide power (e.g., hydraulic power) to the implement. Further, the agricultural vehicle 12 may include a horn 20 that may generate sound when activated. In manually controlled vehicles with an operator within the cab of the vehicle, the operator may make eye contact or gesture to workers proximate to the vehicle acknowledging that the operator is aware of presence of the workers. However, in autonomous vehicles, there may be no operator present in the cab to acknowledge the presence of the workers before operation of the agricultural system is initiated. Accordingly, in the illustrated embodiment, the agricultural vehicle 12 includes a status indicator 22 (e.g., including a lighting assembly) configured to indicate the operating state of the autonomous agricultural vehicle 12 to the workers proximate to the vehicle. For example, the status indicator 22 may inform the workers proximate to the agricultural system that operation of the agricultural system may be initiated. In certain embodiments, the status indicator 22 includes a multicolor lighting assembly (e.g., having multiple colored lights) configured to indicate various operating states of the agricultural system 10. While the illustrated status indicator 22 includes multiple colored lights, in other embodiments, the lighting assembly may include a light indicator configured to generate multiple colors. In addition, the agricultural system 10 may include an audio assembly configured to generate sounds indicative of the various operating states of the agricultural system 10.

Figure 2:
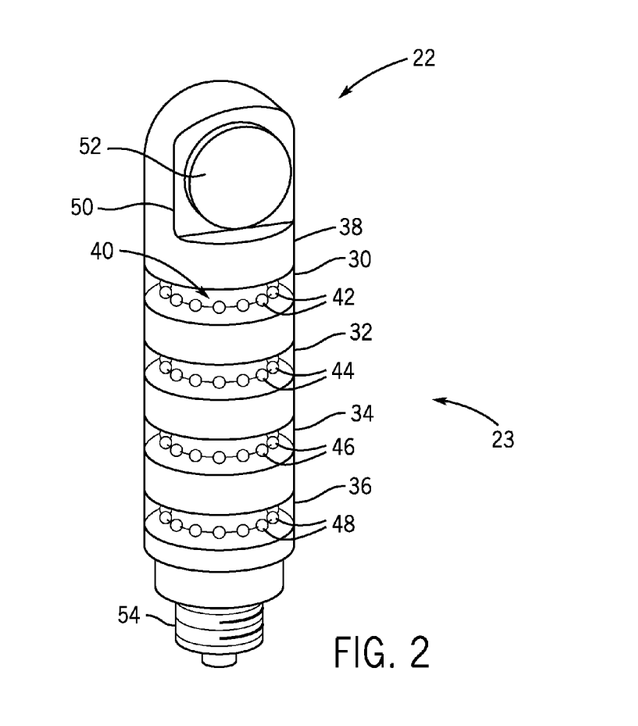
FIG. 2 is a perspective view of an embodiment of a status indicator having a lighting assembly that may be employed on the agricultural system of FIG. 1.

FIG. 2 is a perspective view of an embodiment of the status indicator 22 having a multicolor lighting assembly 23 that may be employed on the agricultural system of FIG. 1. As an example, the status indicator 22 may be a preassembled device, such as a Banner TL50BL tower light, available from Banner Engineering Corp. of Minneapolis, Minn. In certain embodiments, the tower light may be modified (e.g., weatherproofed) for outdoor use. The illustrated lighting assembly 23 includes four colored light indicators 30, 32, 34, and 36 that are each configured to omit light of a different color to indicate that the agricultural system 10 is in a certain state, such as performing an operation or may commence performing an operation in the near future (e.g., within 1 second, 5, seconds, 10 seconds, or one minute later). While four colored light indicators are included in the illustrated embodiment, two, three, four, five, or any suitable number of colored light indicators may be included in the lighting assembly 23. The status indicator 22 includes a cylindrical body 38, and each of the colored light indicators 30, 32, 34, and 36 is annular to enable viewing by workers proximate to and/or remote from the agricultural vehicle 12. That is, workers in front, behind, or to the lateral sides of the agricultural vehicle 12 may view the lighting assembly 23 to identify the operating state of the agricultural system 10.

In the illustrated embodiment, each of the colored light indicators 30, 32, 34, and 36 include an annulus 40 of one or more color light emitting diodes (LEDs) 42, 44, 46, and 48, respectively, that emit light radially outward from the cylindrical body 38. Further, as mentioned above, each of the colored light indicators 30, 32, 34, and 36 may be a different color to indicate different operating states (e.g., each color may indicate a corresponding operating state, or a combination of colors may indicate an operating state). For example, a red light indicator 30 may include red LEDs, the yellow light indicator 32 may include yellow LEDs, the green light indicator 34 may include green LEDs, and the blue light indicator 36 may include blue LEDs. Although these colors are used herein, it should be noted that any number of any suitable combination of colors may be used. Further, the colored light indicators 30, 32, 34, and 36 are segmented vertically along the cylindrical body 38. The color light indicators may be positioned in a recognizable pattern to enable colorblind or partially colorblind individuals to recognize the operating state of the agricultural system 10. For example, a light on top of the colored light assembly 23 may correspond to the red light indicator that enables colorblind or partially colorblind individuals to recognize that agricultural vehicle 12 may begin motion while the light indicator 30 on top of the colored light assembly 23 emits light.

Moreover, an audio system 50 is positioned at a top of the cylindrical body 38 and includes one or more speakers 52 to notify workers of certain operating states of the vehicle. For example, when operation of the engine of the autonomous agricultural vehicle occurs while the vehicle is substantially stationary, the speaker 52 may emit a sound to notify workers in proximity to the agricultural vehicle 12 of the operating state. In certain embodiments, the sound may be directed in a downward direction to better enable workers to hear the broadcasted sounds. The status indicator 22 includes a connector 54 at a bottom of the cylindrical body 38 to physically and electrically couple the status indicator 22 to the agricultural vehicle 12 and to a control system of the agricultural vehicle 12. That is, the threading of the connector 54 is mounted to a top of the agricultural vehicle 12.

Figure 3:
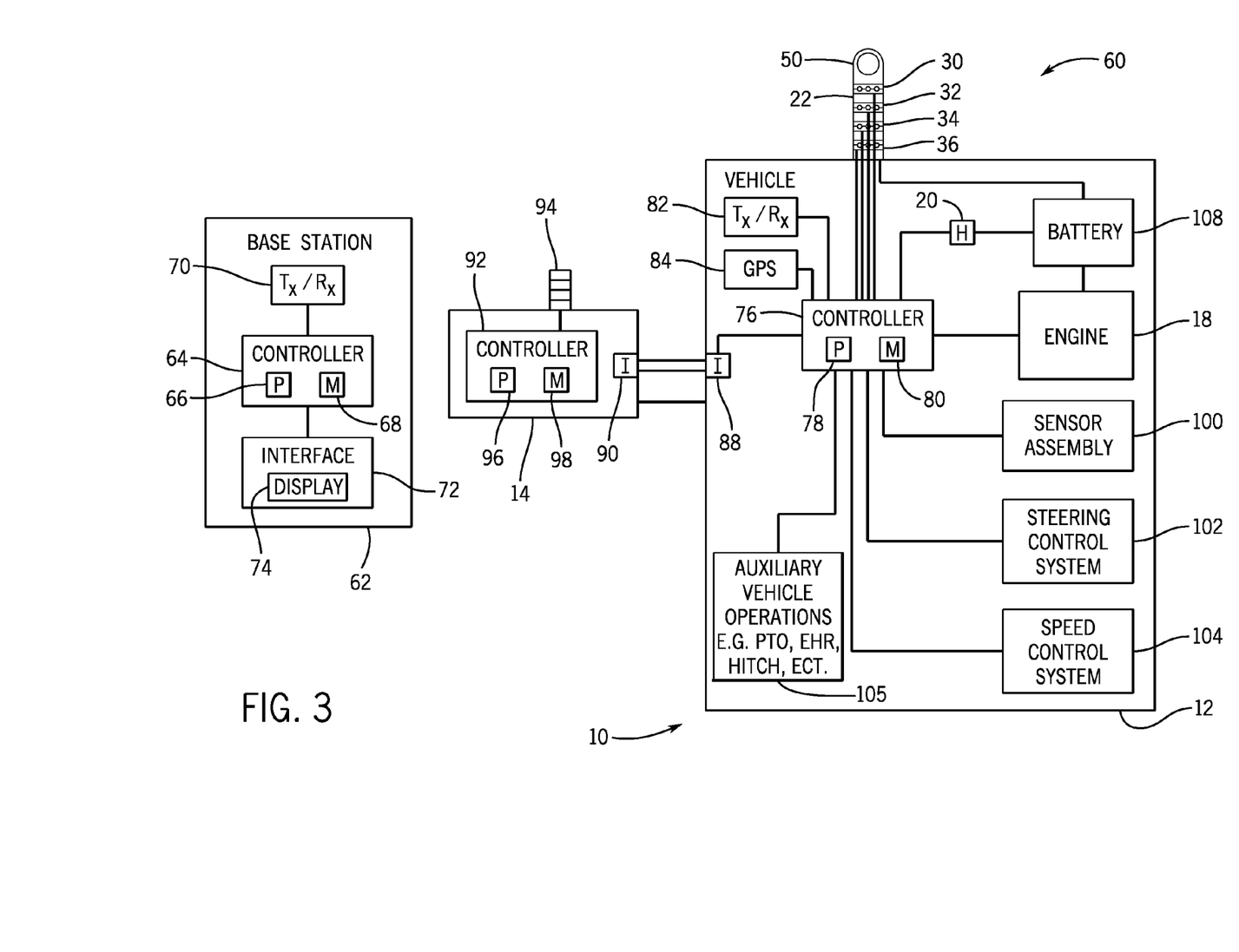
FIG. 3 is a block diagram of an embodiment of a control system that may control the status indicator of FIG. 2.

FIG. 3 is a schematic diagram of an embodiment of a control system 60 that is utilized to control the agricultural vehicle 12 and the agricultural implement 14 of FIG. 1. The control system 60 includes a base station 62 having a base station controller 64. The base station controller 64 includes a processor 66, memory 68, a transceiver 70, and a user interface 72 having one or more displays 74. The base station controller 64 may receive input, via the display 74 (e.g., touchscreen), indicative of one or more operations to be performed by the agricultural system 10. In other embodiments, the base station controller 64 may receive input via a keyboard and mouse, or the base station controller 64 may determine operations to be performed (e.g., based on input data). Further, the base station controller 64 may generate and send signals via the transceiver 70 to the agricultural system 10 indicative of instructions to perform the agricultural operations. While the controller 64 is provided as an example of a method for sending instructions, any suitable method for sending instructions to the system 10 may be used.

In the illustrated embodiment, the control system 60 includes a vehicle controller 76 having a processor 78 and memory 80. For example, the vehicle controller 76 may receive signals from a transceiver 82 and a spatial locating device 84. Further, the vehicle controller 76 may generate and send signals to the horn 20, the status indicator 22, and/or an interface 88, which is configured to communicate with an interface 90 of an implement controller 92. The agricultural implement 14 may include the implement controller 92 having a processor 96 and a memory 98. The implement controller 92 is configured to send and/or receive signals from the vehicle controller 76 via the interface 90. The implement 14 may include a status indicator operatively coupled to the controller 92. While the illustrated embodiment has an agricultural implement 14 having a controller, other implements may include the status indicator communicator 94 coupled to the vehicle controller via the interfaces 88 and 90. In other embodiments, the agricultural implement 14 may not have an additional status indicator 94. The vehicle controller 76 is communicatively coupled to various systems. For example, each colored light indicator 30, 32, 34, and 36 and the speaker 52 may be individually communicatively coupled to the controller, although the wires for the coupling may be bundled (e.g., via an M12 connector). In some embodiments, the processor 78 may communicate (e.g., wirelessly or wired) in serial communication via a communication protocol (e.g., a local interconnect network (LIN) protocol, WiFi and Ethernet communication via Controller Area Network (CAN) communication) with various systems, such as the status indicator 22.

In the illustrated embodiment, the controllers 64, 76, and 92 each include a processor, such as the microprocessor 66, 78, and 96, and a memory, such as the memory devices 68, 80, and 98, respectively. The controllers 64, 76, and 92 may also include one or more storage devices and/or other suitable components. The processors 66, 78, and 96 may be used to execute software, such as software for controlling the agricultural system, and so forth. Moreover, the processors 66, 78, and 96 may include one or more "general-purpose" microprocessors, one or more special-purpose microprocessors, and/or one or more application specific integrated circuits (ASICS), or some combination thereof. For example, the processor 66, 78, and 96 may include one or more reduced instruction set (RISC) processors.

The memory devices 68, 80, and 98 may include a volatile memory, such as random access memory (RAM), and/or a nonvolatile memory, such as ROM. The memory device 68, 80, and 98 may store a variety of information and may be used for various purposes. For example, the memory devices 68, 80, and 98 may store processor-executable instructions (e.g., firmware or software) for the processors 66, 78, and 96 to execute, such as instructions for controlling the agricultural vehicle 12. The storage device(s) (e.g., nonvolatile storage) may include read-only memory (ROM), flash memory, hard drive(s), or any other suitable optical, magnetic, or solid-state storage medium, or a combination thereof. The storage device(s) may store data (e.g., associated with operating states of the agricultural system 10), instructions (e.g., software or firmware for controlling the status indicator 22), and any other suitable data.

In the illustrated embodiment, the agricultural vehicle 12 includes a spatial locating device 84 communicatively coupled to the controller 76 and mounted to the agricultural vehicle 12. The spatial locating device may be configured to determine a position of the agricultural vehicle 12. The spatial locating device 84 may include any suitable system configured to determine the position of the agricultural vehicle 12, such as a global positioning system (GPS) receiver, for example. In certain embodiments, the spatial locating device 84 may be configured to determine the position of the agricultural vehicle 12 and/or the agricultural implement 14 relative to a fixed global coordinate system (e.g., via the GPS receiver) or a fixed local coordinate system. Further, in some embodiments, the spatial location of the agricultural vehicle 12 or the agricultural implement 14 may be determined. For example, the agricultural implement location may be determined based on the geometry of the agricultural implement 14 and/or the geometry of the agricultural vehicle 12 and the GPS location of the agricultural vehicle 12. In certain embodiments, the transceiver 82 may broadcast signals indicative of the position of the agricultural vehicle 12 to the transceiver 70 of the base station 62.

In addition, the agricultural vehicle 12 includes a sensor assembly 100 to facilitate autonomous control of the agricultural vehicle 12. For example, the sensor assembly 100 may include multiple sensors (e.g., infrared sensors, ultrasonic sensors, magnetic sensors, etc.), used in controlling the agricultural vehicle 12. Further, the vehicle controller 76 is configured to receive signals from the sensor assembly 100, the transceiver 82, and the spatial locating device 84 to control one or more operations of the agricultural system 10 based on the received signals.

The processor 78 may generate and send signals to control one or more operations of the agricultural vehicle 12 and/or the agricultural implement 14. For instance, the processor 78 may send signals to a steering control system 102 to control a direction of movement of the agricultural vehicle 12 and/or to a speed control system 104 configured to control a speed of the agricultural vehicle 12. In addition, the processor 78 may send signals to the implement controller 92 to control operation of the agricultural implement 14 (e.g., raise/lower tools on the implement 14, fold/unfold wings of the implement, etc.). The processor 78 of the vehicle controller 76 may generate and send a signal to the engine 18 to activate or deactivate the engine 18. Further, the processor 78 may send signals to control hydraulics, pneumatics, electrical systems, or a combination thereof, of the agricultural implement 14. For example, the processor 78 may send signals, via the interface 88, to raise a tillage implement to a transport position.

In the illustrated embodiment, the processor 78 is configured to obtain an indication of and/or to determine a current operating state of the agricultural system 10, to determine a status indication corresponding to the current operating state, and to output a status signal indicative of instructions to control the status indicator 22 based on the determined status indication. For example, the processor 78 may receive signals from the base station 62 indicative of instructions to deactivate the agricultural vehicle 12. While the engine 18 of the agricultural vehicle 12 is deactivated, the processor 78 may determine that the agricultural vehicle 12 is in an operational state corresponding to conditions in which workers may approach the agricultural vehicle 12. As such, the processor 78 may send a signal to the status indicator 22 indicative of instructions to activate the colored light indicator 34 with a solid green light to indicate that workers may approach the agricultural vehicle 12 while the engine 18 is deactivated. While the engine 18 is deactivated, the processor 78 may send signals to the status indicator 22 indicative of instructions to flash the red colored light indicator 30 while a connection is established between the vehicle controller 76 and the base station 62 to indicate to workers that the engine 18 may be activated at any time. While the connection is established, the processor 78 may further receive signals from the base station 62 to activate the engine 18 and/or a battery 108, thereby energizing the agricultural vehicle 12. While the battery 108 and/or the engine 18 is energized, the processor 78 may send a signal to the status indicator 22 indicative of instructions to activate the red light indicator 30 with a solid red light to indicate to workers that the system is energized.

In certain embodiments, the agricultural vehicle 12 may operate in a manual mode in which an operator controls various operations from within the cab of the vehicle or from a remote location. The agricultural vehicle 12 may also operate in an automatic mode in which the processor 78 controls the operation of the agricultural vehicle 12. While the agricultural vehicle 12 is in the manual mode, the processor 78 may send a signal to the status indicator 22 indicative of instructions to flash the green colored light indicator 34, thereby indicating that an operator is controlling the system 10.

The processor 78 may also control the agricultural implement 14. For example, the processor 78 may actuate hydraulics of the agricultural implement 14 to lower the implement before performing a tilling operation. In certain embodiments, the processor 78 may send signals to auxiliary vehicle operations 105. For example, the processor 78 may send signals to control valves of the agricultural vehicle 12 (e.g., electro-hydraulic remote valves) coupled to a hydraulic cylinder on the implement that actuates implement systems (e.g., (raise/lower, fold/unfold, etc.). In other embodiments, the agricultural implement 14 may receive power from the agricultural vehicle 12 and have hydraulic control valves on the agricultural implement 14 that control the auxiliary vehicle and implement operations (e.g., control valves on a baler, fan and alternator speed control valves on a planter, etc.). Further, the control valves on the agricultural implement 14 may be controlled by the controller 92 on the agricultural implement 14. While sending the signal indicative of instructions to actuate the hydraulics of the agricultural implement 14, the processor 78 may send signals to the status indicator 22 indicative of instructions to activate the blue light indicator 36.

The processor 78 may obtain signals from the base station 62, the sensor assembly 100, the spatial locating device 84, or a combination thereof, indicative of location and/or position of the agricultural vehicle 12. Based on the position of the agricultural vehicle 12 and a plan indicating the desired path of the vehicle, the processor 78 may determine a target direction and a target speed of the agricultural vehicle 12. The processor 78 may send signals to the status indicator 22 instructing the status indicator 22 that the agricultural vehicle 12 is in motion or is expected to begin motion within a time period (e.g., within 1 second, 5, seconds, 10 seconds, or one minute later). For example, the processor 78 may send signals to activate the yellow lighting indicator 32 while the vehicle is in motion and may send signals indicative of instructions to vary the brightness of the lighting depending on the speed of the agricultural vehicle 12.

When an error condition is detected, the processor 78 may output signals indicative of instructions to flash multiple lights to indicate the error condition, thereby alerting works to avoid the vehicle. The error condition may be due to a loss of communication with the base station 62, loss of GPS signal, a fault within the agricultural vehicle 12 (e.g., transmission fault, etc.), a fault within the implement 14, or a combination thereof, among others. Further, in certain embodiments, the processor 78 may send signals to the status indicator 22 indicative of instructions to flash different patterns of lights to indicate that a particular error condition is present. For example, the processor 78 may output signals indicative of instructions to alternately flash all lights and the red light to indicate loss of communication with the base station 62, and/or alternately flash all lights and the blue light to indicate loss of GPS signal.

Alternatively and/or additionally, the processor 78 may send signals to the audio system 50 indicative of instructions to provide audible alerts to the workers to indicate an operation condition, such as vehicle motion, implement operation, engine activation/deactivation, communication establishment, or the like. For example, the processor 78 may send a signal to the audio system 50 to sound a first audible alert while the vehicle is in motion. Then, the processor 78 may send another signal to the audio system 50 to sound a second audible alert, different from the first audible alert, while the pneumatic or hydraulic system of the implement is operating. By sounding different audible alerts for different operating states, workers who may be unable to see the lighting assembly 23 may be aware of impending vehicle operations, among other conditions.

To reduce power consumption, the processor 78 may utilize the speaker 52 of the audio system 50 while the engine 18 is deactivated. In some embodiments, the audio system 50 may draw power from the battery 108. To conserve power of the battery 108, the processor 78 may send certain signals to the audio system 50 and other signals to the horn 20, which is also electrically coupled to the battery, but may draw more current. For example, because the audio system 50 draws less current and uses less power overall than the horn 20, the processor 78 may send signals to generate a sound, via the audio system 50, indicating that the engine 18 is deactivated. To generate louder sounds, the processor 78 may send signals to the horn 20 (e.g., while the engine 18 is operating) to enable workers to hear the sounds related to vehicle operations (e.g., notify workers that the agricultural vehicle 12 is moving forward) over the sounds of the engine.

In the illustrated embodiment, the processor 78 may be configured to send signals to a first indicator and a second indicator to indicate the operating state. For example, the processor 78 may send signals to instruct the status indicator 22 to provide the solid red light indicator 30 and to send signals to instruct the status indicator 22 to deactivate the green indicator 34 while the agricultural system 10 is in an autonomous operating state. To improve redundancy, the deactivated green indication may enable workers to be notified of the operating state of the agricultural system 10.

Figure 4:
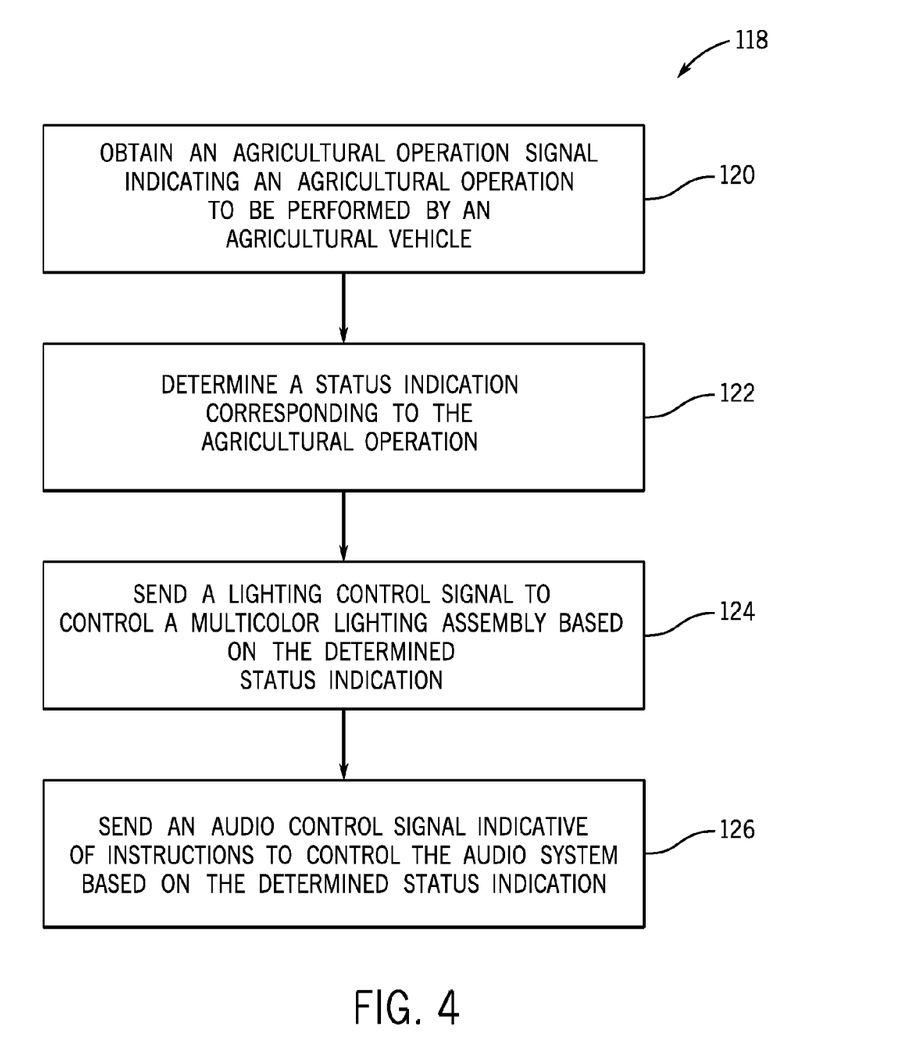
FIG. 4 is a flow diagram of an embodiment of a method that may be performed by the control system to control the status indicator of FIG. 2.

FIG. 4 is a flow diagram of an embodiment of a method 118 for controlling a status indicator 22 of an agricultural system 10. The method 118 may be stored as instructions (e.g., code) in the memory and executed by the processor 78. First, as represented by block 120, the processor 78 obtains an agricultural operation signal indicative of an operating state or determines the operating state. For example, the processor 78 may receive the agricultural operation signal from the base station 62, via communication between the transceivers 70 and 82, and/or from processes performed on the processor 78. The operating states may include non-operation of an engine of the autonomous agricultural vehicle, operation of the engine of the autonomous agricultural vehicle, occupation of a cab of the autonomous agricultural vehicle, operation of the autonomous agricultural vehicle in manual mode, establishment of a connection between the autonomous agricultural vehicle and the base station, movement of the autonomous agricultural vehicle, operation of an actuator of an implement of the autonomous agricultural vehicle, occurrence of a fault, or any combination hereof.

At block 122, the processor 78 determines a status indication corresponding to the current operating state. For example, the processor 78 may select flashing the green indicator 34 in response to manual operation of the agricultural vehicle 12.

TABLE 1

Status Indications for operating states

| Status Indication | Operating state |
|---|---|
| Solid red color light indication | Operation of the engine of the autonomous agricultural vehicle |
| Flashing red colored light indication | Establishment of a connection between the autonomous agricultural vehicle and the base station |
| Solid green light indication | Non-operation of an engine of the autonomous agricultural vehicle |
| Flashing green colored light indication | Operation of the autonomous agricultural vehicle in manual mode |
| Solid blue light indication | Operation of an actuator of an implement |

Each status indications for each respective operating states may be stored and/or retrieved from the memory 80. At block 124, the processor 78 sends a lighting control signal to the lighting assembly 23 to instruct the light indicators 30, 32, 34, and 36 to emit light in response to the determined status indication. The lighting control signals may be indicative of instructions to provide flashing, solid, single or multiple lights, as well as any suitable patterns. As discussed above, the control signals may include audio signals via the speaker 52 and/or the horn 20.

At block 126, the processor 78 sends an audio control signal indicative of instructions to control the audio system 50 based on the determined status indication. For example, the processor 78 may send the audio control signal to a low power alarm (e.g., low current alarm), such as the audio system 50, while autonomous agricultural vehicle 12 is in a current operating state (e.g., an operating state in which the engine is deactivated). Further, the processor 78 may be configured to send another audio control signal to a high power alarm (e.g., high current alarm), such as the horn 20, while the autonomous agricultural vehicle 12 is in another operating state (e.g., an operating state in which the engine is activated), different from the current operating state. While audio is used as an example above, the low power and high power alarms may include visual alarms, audio alarms, or both.

As noted above, the operating states, the color choices, and the audio choices described above are meant to be illustrative. In other embodiments, the agricultural system 10 may include any number of other operating states, any number of any color choices, and/or any number of audio choices may be suitable for the agricultural system 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An indicator system for an autonomous agricultural vehicle, comprising:
    a multicolor lighting assembly; and
    a controller comprising a memory operatively coupled to a processor, wherein the processor is configured to select a status indication from a plurality of status indications that corresponds to a current operating state of a plurality of operating states, and to output a first signal indicative of instructions to control the multicolor lighting assembly based on the status indication, wherein the plurality of states comprises at least one operational state based on operation of an actuator of an implement coupled to the autonomous agricultural vehicle;
    wherein the agricultural implement is towed in operation by the agricultural vehicle, the agricultural implement comprises a tillage tool, the agricultural implement comprises a fertilizer application tool, the agricultural implement comprises a seeding or planting tool, the agricultural implement comprises a harvesting tool, or any combination thereof;
    wherein the multicolor lighting assembly emits a light in response to the first signal.

2. The indicator system of claim 1, wherein the processor is configured to send a second signal to a high power alarm while the autonomous agricultural vehicle is in the current operating state and to send a third signal to a low power alarm while autonomous agricultural vehicle is in another operating state of the plurality of operating states, different from the current operating state, and wherein the high power alarm utilizes more energy than the low power alarm.

3. The indicator system of claim 2, wherein the high power alarm comprises a horn powered by the battery of the autonomous agricultural vehicle and wherein the processor is configured to send the second signal to the horn to generate an audible alarm.

4. The indicator system of claim 1, wherein the processor is configured to output the first signal to the multicolor lighting assembly via a communication protocol.

5. The indicator system of claim 1, wherein the plurality of operational states comprises non-operation of an engine of the autonomous agricultural vehicle, operation of the engine of the autonomous agricultural vehicle, occupation of a cab of the autonomous agricultural vehicle, operation of the autonomous agricultural vehicle in manual mode, establishment of a connection between the autonomous agricultural vehicle and the base station, movement of the autonomous agricultural vehicle, operation of an actuator of an implement of the autonomous agricultural vehicle, occurrence of a fault, or any combination hereof.

6. The indicator system of claim 1, wherein the multicolored lighting assembly comprises an annular lighting indicator to facilitate visibility of the emitted light from a position outside of the autonomous agricultural vehicle.

7. The indicator system of claim 1, wherein the controller is configured to send the first signal instructing the multicolor lighting assembly to emit light in a first color to indicate a first operating state and to emit light in a second color to indicate a second operating state.

8. The indicator system of claim 7, wherein the multicolor lighting assembly is positioned on a top of the autonomous agricultural vehicle to enable visibility of a lighting indicator of the multicolor lighting assembly.

9. The indicator system of claim 1, wherein the controller is configured to output the first signal when the actuator has positioned the implement in a raised position.

10. The indicator system of claim 1, wherein the controller is configured to output the first when the actuator has positioned the implement in a lowered position.

11. An indicator system for an autonomous agricultural vehicle, comprising:
    a lighting assembly comprising at least one light indicator, wherein the at least one light indicator is configured to emit a flashing light to indicate a first operational state of the autonomous agricultural vehicle and to emit a continuous light to indicate a second operational state of the autonomous agricultural vehicle, different from the first operational state; and
    a controller comprising a processor operatively coupled to a memory, wherein the controller is configured to instruct the at least one light indicator to emit the flashing light or the continuous light based on the first operational state or the second operational state, and wherein the controller is configured to instruct the lighting assembly to emit a second flashing light in conjunction with the flashing light to create a pattern that corresponds to a type of fault associated with operation of the autonomous agricultural vehicle.

12. The indicator system of claim 11, wherein the lighting assembly is configured to emit at least one of the flashing light and the continuous light in a first color and wherein the lighting assembly comprises at least one other light indicator configured to emit a light in a second color, different from the first color.

13. The indicator system of claim 11, comprising an audio system communicatively coupled to the controller, wherein the controller instructs the audio system to emit a sound based on at least one of the first operational state and the second operational state.

14. The indicator system of claim 11, wherein the controller is configured to send signals to cause the light indicator to emit at least one of the flashing light and the continuous light based on at least one of the first operational state and the second operational state of an implement coupled to the autonomous agricultural vehicle.

15. An indicator system for an autonomous agricultural vehicle, comprising:
- a multicolor lighting system comprising at least one light indicator; and
- a controller configured to instruct the at least one light indicator to emit light of a first color to indicate a first operational state of a plurality of operational states of the autonomous agricultural vehicle and to emit light of a second color, different from the first color, to indicate a second operational state of the plurality of operational states of the autonomous agricultural vehicle;
- wherein the first operational state comprises establishment of a connection between the autonomous agricultural vehicle and a base station, occupation of a cab of the autonomous agricultural vehicle, operation of an actuator of an implement coupled to the autonomous agricultural vehicle, or any combination thereof, wherein the agricultural implement is towed in operation by the agricultural vehicle, the agricultural implement comprises a tillage tool, the agricultural implement comprises a fertilizer application tool, the agricultural implement comprises a seeding or planting tool, the agricultural implement comprises a harvesting tool, or any combination thereof.

16. The indicator system of claim 15, wherein the controller is configured to instruct the at least one light indicator to emit a flashing light to indicate at least one of the first operational state, the second operational state, or a third operational state of the plurality of operational states of the autonomous agricultural vehicle.

17. The indicator system of claim 15, wherein the controller is configured to instruct the at least one light indicator to emit a flashing light in the first color to indicate the first operational state.

18. The indicator system of claim 15, wherein the at least one light indicator comprises a first light indicator configured to emit light of the first color and a second light indicator configured to emit light of the second color.

19. The indicator system of claim 15, wherein the multicolored lighting system comprises an annular lighting indicator to facilitate visibility of the emitted light from a position outside of the autonomous agricultural vehicle.

20. The indicator system of claim 15, wherein the multicolor light system is positioned on a top of the autonomous agricultural vehicle to facilitate visibility of the at least one light indicator of the multicolor lighting assembly.

* * * * *